United States Patent [19]

Le Roy et al.

[11] 4,366,301
[45] Dec. 28, 1982

[54] CROSSLINKABLE THERMOPLASTIC POLYURETHANE RESINS CONTAINING ETHYLENIC SIDE GROUPS

[75] Inventors: Patrice M. Le Roy, Ballancourt; Jacky P. Pattein, Etrechy, both of France

[73] Assignee: Societe Nationale des Poudres et Explosifs, Paris, France

[21] Appl. No.: 258,890

[22] Filed: Apr. 30, 1981

[30] Foreign Application Priority Data

May 14, 1980 [FR] France ................................ 80 10807

[51] Int. Cl.$^3$ ............................................. C08G 18/32
[52] U.S. Cl. .................................. 528/66; 156/330.9; 428/423.1; 428/425.5
[58] Field of Search ................ 528/66, 75; 156/330.9; 428/423.1, 425.5

[56] References Cited

U.S. PATENT DOCUMENTS 3,509,234 4/1970 Burlant et al. ..................... 525/440

FOREIGN PATENT DOCUMENTS 1366079 6/1964 France .
1418816 10/1965 France .
2136779 12/1972 France .

OTHER PUBLICATIONS

Aleev et al., Chem. Abstr. 72, 101171y, 1970, p. 5.

*Primary Examiner*—Maurice J. Welsh
*Attorney, Agent, or Firm*—Bucknam and Archer

[57] ABSTRACT

The invention relates to the field of crosslinkable thermoplastic polyurethane resins containing ethylenic side groups.

This resin preferably results from the reaction of (a) an organic diisocyanate, (b) a saturated linear diol, (c) a diol having a molecular weight of less than 300, and (d) an unsaturated diol consisting of the acrylic or methacrylic acid ester of a trihydric alcohol, of the formula:

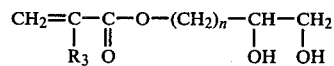

in which $R_3$=Me or H and n is an integer between 1 and 4. 2,3-Dihydroxypropyl acrylate will preferably be used.

The polyurethane resin according to the invention can be processed in accordance with the well-known traditional processes for thermoplastics, while at the same time being capable of undergoing crosslinking, by virtue of their unsaturated side groups, to form a three-dimensional lattice.

Application to profiles and prepregs.

10 Claims, No Drawings

CROSSLINKABLE THERMOPLASTIC POLYURETHANE RESINS CONTAINING ETHYLENIC SIDE GROUPS

The present invention relates to new crosslinkable thermoplastic polyurethane resins containing ethylenic side groups, and to the materials obtained by crosslinking the said resins.

The invention also relates to the said materials containing fibres as a filler.

Linear or non-linear polyurethane resins containing ethylenic end groups, such as acrylic or methacrylic groups, are known. These resins are obtained, for example, from a prepolymer having isocyanate end groups and from acrylic or methacrylic acid esters having a hydroxyl end group, such as ethyl 2-hydroxyacrylate.

Numerous documents, amongst which French Pat. No. 2,136,779 and U.S. Pat. No. 3,509,234 may be mentioned, describe this family of products.

However, the number of crosslinkable ethylenic groups in this type of product is limited because it depends directly on the number of end groups in the prepolymer. Moreover, it is difficult to obtain a three-dimensional lattice unless non-linear prepolymers or a polyfunctional crosslinking agent are used.

Resinous substances which contain acrylic or methacrylic side groups and which are obtained by reacting diisocyanates, diols, polyhydroxyl compounds and an acrylic or methacrylic acid ester of a polyhydric alcohol, such as, for example, glycerol monoacrylate, are also known from French Pat. No. 1,418,816.

These polyurethane resins are useful in particular as coverings but are not absolutely thermoplastic, which considerably restricts the possible processing methods and hence the possible uses.

The subject of the invention relates to a new family of thermoplastic polyurethane resins which, by virtue of being thermoplastic, can be processed in accordance with the well-known traditional processes for thermoplastics (injection moulding, extrusion, dissolution, rotational moulding, compression moulding and the like), whilst at the same time being capable of undergoing crosslinking, by virtue of their unsaturated side groups, to form a three-dimensional lattice.

Thus, as well as having the advantages of being able to undergo subsequent crosslinking to form a three-dimensional lattice (heat resistance, mechanical properties, resistance to chemical attack, dimensional stability and the like), these resins can be processed by the methods used for thermoplastics.

According to the invention, the thermoplastic polyurethane resin contains ethylenic side groups and is characterised in that it results from the reaction of:

(a) an organic diisocyanate, (b) a long-chain saturated linear diol having a molecular weight of between 450 and 4,000 and preferably between 500 and 2,500, (c) an aliphatic, cycloaliphatic or aromatic compound having a molecular weight of less than 300, which contains from 2 to 20 carbon atoms and possesses two groups having at least one hydrogen atom which is active towards the NCO groups, and (d) an unsaturated diol consisting of the acrylic or methacrylic acid ester of a trihydric alcohol, of the formula:

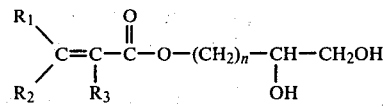

in which $R_1$ and $R_2$, which are identical or different, are hydrogen, a lower alkyl group, an aryl group or a halogen, $R_3$ is hydrogen, a lower alkyl, aryl or cycloalkyl group or a halogen and n is an integer between 1 and 4, the diisocyanate compound (a) being present in a ratio NCO:group having at least one H which is active towards the NCO groups, which is less than or equal to 1.1, the molar ratio diol (b):compounds (c)+(d) being between 0 and 10 and the molar ratio compound (c): unsaturated diol (d) being between 0 and 10 if b≠0 and between 1 and 10 if b=0.

In the description which now follows, the term "side groups" will denote the ethylenic groups which have not reacted and which are present, like branches, over the whole length of the linear skeleton of the polyurethane molecule.

The term "acrylic groups" will be understood generically as meaning all the substituted or unsubstituted ethylenic double bonds conjugated with a carbonyl group.

The diisocyanates which can be used within the scope of the invention are well known and any compounds which contain two free NCO groups can advantageously be used. Amongst these compounds, there may be mentioned aliphatic, cycloaliphatic and aromatic diisocyanates having a molecular weight of less than 300, such as, for example: 1,3- and 1,4-xylylene diisocyanates, 2,4- and 2,6-tolylene diisocyanates (TDI), 4,4'-diphenylmethane diisocyanate (MDI), 1,5-naphthylene diisocyanate, 1,4- and 1,6-hexamethylene diisocyanates, 1,4-tetramethylene diisocyanate, 4,4'-methylene-bis-(cyclohexyl isocyanate) (Hylene w), 4,4'-isopropyl-bis-(cyclohexyl isocyanate), 1,4-cyclohexyl diisocyanate and 3-isocyanatomethyl-3,5,5-trimethylcyclohexyl isocyanate (IPDI).

However, taking into account the much higher reactivity of the aromatic isocyanates, it is preferable, in this case, to use less reactive diols so as not to exceed the critical temperature which brings about crosslinking.

Usually, the aromatic diisocyanates are used in applications which do not require a high degree of stability to light. Thus, the aliphatic or cycloaliphatic isocyanates will preferably be used for applications requiring good optical properties (transparency, absence of coloration), a good fastness to adverse weather conditions (fastness to UV) and good properties at low temperature; in this case, 4,4'-methylene-bis-(cyclohexyl isocyanate) will advantageously be used.

The term "saturated long-chain diols" is understood as meaning macrodiols which have a molecular weight of between 450 and 4,000, preferably between 500 and 2,500, and which can consist of polyester, polyether, polytetrahydrofuran, polycaprolactone and polycarbonate groups, depending on the importance given to the well-known specific characteristics provided by each of these units.

Thus, it is well known that, if it is desired to obtain polyurethane resins which are resistant to hydrolysis and have good properties at low temperature, it is advantageous to use polyethers. Polyesters on the other hand, will provide improvements in terms of the mechanical properties. Polycarbonates are very advantageous because of their excellent mechanical properties, their resistance to hydrolysis and their adhesive properties.

Amongst the polyesters, there may be mentioned poly-(ethylene glycol) adipate, poly-(propylene glycol) adipate and, in general, polyesters prepared from a saturated diacid, or its anhydride, and a saturated diol, such as those which have been mentioned above. Polycaprolactones may be mentioned as a sub-class of polyesters.

Polyether-esters, such as poly-(diethylene glycol) adipate, in which the polyether replaces part of the glycol, may also be mentioned.

Polydiol carbonates which may be introduced are polybutanediol carbonate or polyhexanediol carbonate.

Amongst the polyethers, there may be mentioned poly-(ethylene glycol) ethers, poly-(propylene glycol) ethers or also polytetrahydrofuran.

The compounds (c) and (d), which generally possess two groups having at least one hydrogen atom which is active towards the NCO groups, act as chain extenders and thus make it possible to adapt the properties of the resins.

The number of ethylenic side groups will be the larger, the smaller the ratio (c):(d).

Amongst the compounds (c) possessing two groups having at least one hydrogen atom which is active towards the NCO groups, diols will advantageously be used.

Amongst these diols, saturated diols, such as ethylene glycol, 1,3-propanediol, 1,4-butanediol, diethylene glycol, 1,6-hexanediol, 1,8-octanediol, 1,10-decanediol, 2,2,4-trimethylhexanediol, 1,2-cyclohexanediol, 1,3-cyclohexanediol and the like, may be mentioned without implying a limitation.

Diols having internal ethylenic unsaturation, such as but-2-ene-1,4-diol, can be used by themselves or mixed with the saturated diols.

1,4-Butanediol, 1,3-butanediol, 1,6-hexanediol or cyclohexanedimethanol is preferably used.

In certain cases, it can be advantageous to replace all or part of the diol by a compound capable of forming urea linkages in the polymer. This compound is in particular, but not uniquely, an aliphatic, cycloaliphatic or aromatic primary or secondary diamine. The following may be mentioned: 1,2-ethanediamine, 1,3-butanediamine, 1,5-pentanediamine, 1,8-octanediamine, 1,2-propanediamine, 1,4-butanediamine, 1,6-hexanediamine and the like.

1,4-Butanediamine or 1,6-hexanediamine is preferably used.

It is also possible to use aromatic diamines, such as p,p'-diaminodiphenylmethane.

It is also possible to use alkanolamines, such as ethanolamine, or meta-aminophenol.

As has been stated above, when it is desired to obtain a product which is stable to light, aliphatic or cycloaliphatic compounds will be preferred.

In the description which now follows, reference will be made solely to diols, which are the compounds (c) preferably used in the present invention. Thus, in this particular case, the compound (c) corresponds to a diol such as described above.

Amongst the unsaturated diols (d) having acrylic or methacrylic unsaturation, it is particularly advantageous to employ a diol consisting of the acrylic or methacrylic acid ester of a trihydric alcohol, of the formula:

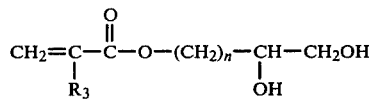

in which $R_3$ and n have the same meaning as above.

These products are described, in particular, in French Pat. No. 1,211,430.

In fact, although the use of unsaturated diols in which the terminal ethylenic carbon is substituted (see general formula) is not excluded according to the invention, the reactivity of these diols is distinctly lower.

Preference will be given to 2,3-dihydroxypropyl acrylate. A particularly advantageous process for obtaining this product has been described in French Patent Application No. 77/15,716 of the Applicant Company.

In the description which follows, the term "short-chain diol" will be used to denote the sum of the molar amounts of the compounds (c) and (d). In fact, as has been stated above, the compound (c) corresponds to a diol in the preferred embodiment of the invention.

The molecular weight of the long-chain diol and also the molar ratio of the long-chain diol to the short-chain diol depend on the application envisaged and, in particular, on the desired rigidity. Thus, this ratio can vary between 0 and 10, depending on the molecular weight of the long-chain diol and the desired rigidity.

The molar ratio of the compound (c) to the unsaturated diol (d) can vary from 0 to 10, depending on the average number of units of unsaturation which it is desired to fix per molecule, and hence depending on the desired final properties.

It is well known to those skilled in the art to adapt the ratio short-chain diol:long-chain diol and the ratio (c):(d) so as to obtain the desired properties.

Thus, if the long-chain diol has a molecular weight of less than 800, it will be preferable to have a ratio long-chain diol:short-chain diol of between 0.25 and 10 and a ratio (c):(d) of between 0 and 1.

On the other hand, if the long-chain diol has a molecular weight above 800, it will be possible to have a ratio long-chain diol:short-chain diol of between 0.1 and 1 and a ratio (c):(d) of between 0 and 2.

In certain cases, if very rigid products are desired, it will be possible not to use any long-chain diol (b), and the ratio (c):(d) will be between 1 and 10. This way is nevertheless less interesting because of the greater difficulty to preserve the thermoplasticity.

It is frequently advantageous to have a perfectly linear and soluble polymer; to do this, the ratio NCO/OH must be about 1. It is generally between 0.95 and 1.1, which makes it possible to obtain polyurethanes having a molecular weight of between 15,000 and 100,000, the melting points of which can be adjusted to between 70° and 140° C.

In order to improve the conditions under which the product is processed (lower its conversion temperature, reduce its viscosity and so on), it can prove equally advantageous to use a lower ratio NCO/OH (less than 0.95) in order to limit the molecular weight. It is thus possible to prepare polyurethanes having a molecular weight of less than 15,000, the softening point of which is below 70° C. Since the product will subsequently be crosslinked, this does not modify the properties of the finished material. In certain cases, this process makes it possible to obtain stronger materials.

In order to improve the processing conditions, it is also possible to add, to the polyurethane resin according to the invention, monomers possessing a unit of unsaturation which is capable of reacting with the acrylic linkages in the resin. The monomers thus act as a reactive diluent system.

Unsaturated monomers which may be mentioned are:

vinyl monomers (vinyl acetate, N-vinylpyrrolidone, styrene); and acrylic or methacrylic monomers (alkyl acrylate, phenoxyethyl acrylate, hexanediol diacrylate, ethoxyethyl acrylate, trimethylolpropane triacrylate and the methacrylate equivalents of the abovementioned compounds).

However, the methacrylic monomers are of less value than the acrylic monomers because of their lower reactivity.

The viscosity of the composition thus formed will depend on the proportion of monomers present. In general, a ratio polyurethane resin:monomer of between 95/5 and 40/60, but preferably between 90/10 and 70/30, will be used.

This mixture makes it possible to lower the softening point and the viscosity of the resin, which permits, on the one hand, lower processing temperatures, and, on the other hand, higher proportions of filler. A further advantage of this variant is that of adjusting the density of the three-dimensional lattice and hence of adapting the properties of the material to the applications envisaged.

Of course, it is possible to combine these two variants (solvent and NCO:OH <0.95), for example if it is desired to carry out the reaction at very moderate temperatures with very fluid systems or if it is desired to introduce a high proportion of filler into the resin.

The polyurethane resins according to the invention can be prepared in bulk or in a solvent by the so-called "prepolymer" process or by the so-called "one-shot" process.

These two processes are well known to those skilled in the art and it is not necessary to give a detailed description thereof.

Briefly, in the "prepolymer" process, part of the diols is reacted with an excess of diisocyanate (2 to 3 times the stoichiometric amount for forming the prepolymer). The free isocyanate groups in the latter then react with the remainder of the diols to form the polyurethane.

In the "one-shot" process, the total amount of the reactants (polyol and isocyanate) is mixed in a single step.

These two processes can be carried out in bulk or in a solvent.

The rate of the reaction between the isocyanate and the polyols can be increased either by means of the amino or metal catalysts which are well known to those skilled in the art, or by increasing the temperature. The reaction can be carried out at temperatures between 40° and 110° C.; however, it will preferably be carried out at temperatures below 70° C. If it is desired to carry out the reaction at a higher temperature, it can be advantageous to add a small amount of an inhibitor. Examples of inhibitors which can be used are hydroquinone or phenothiazine, in amounts of between 0 and 5,000 ppm.

The invention also relates to the use of the polyurethane resins according to the invention, in a second stage, for producing a three-dimensional lattice by opening and polymerising the ethylenic side groups.

The crosslinking of the unsaturated polyurethane or the polyurethane/monomer mixture can be carried out in accordance with any of the well-known processes of free-radical polymerisation:

(A) thermal polymerisation or high-frequency polymerisation, in the presence or absence of free-radical promoters (peroxides, hydroperoxides or azo-type promoters), at the customary polymerisation temperatures, but preferably at between 50° and 220° C. Non-limiting examples of promoters which may be mentioned are dicumyl peroxide, tert.-butyl peroxide, benzoyl peroxide, lauroyl peroxide, cumene hydroperoxide, dicyclohexyl percarbonate, azo-bis-isobutyronitrile and the like;

(B) polymerisation at ambient temperature under ultraviolet irradiation, in the presence of photoinitiators or photosensitisers, under the customary conditions. Non-limiting examples of photoinitiators which may be mentioned are: benzoin ethers and phenone derivatives, by themselves or in association with an amine (benzophenone, diethoxyacetophenone, Irgacure 651 from CIBA or Darocur 1116 from MERCK).

However, this type of polymerisation is limited, on the one hand, to the applications for which the products contain little or no filler, and, on the other hand, to low thicknesses (less than 1 mm and preferably less than 100 $\mu$m).

This method of crosslinking is particularly suitable for varnish or for the case where it is desired to cure only the surface of the material in order to increase the abrasion resistance thereof, whilst at the same time preserving a thermoplastic material in the core; in this manner, an excellent impact strength is preserved, coupled with a good surface resistance to scratching.

It is preferable to employ a free-radical promoter. This makes it possible to adjust the baking temperature.

It is advantageous, inter alia, to introduce it during the formation of the thermoplastic polyurethane, taking care, of course, to use a promoter with a sufficiently long half-life; this variant makes it possible to obtain final products with better mechanical properties.

(C) polymerisation under $\beta$ or $\gamma$ irradiation. These methods of crosslinking make it possible to cure, in the core and without heating, materials which may or may not contain filler. The value is obvious in the case where it is desired to use a process which permits high production rates (extrusion, injection moulding) to manufacture materials with good mechanical performances, which contain heat-sensitive substances.

The invention thus relates to:

the preparation, in a first stage, of a linear polyurethane possessing unsaturated side groups, and the production, in a second stage and starting from polyurethane (processed in accordance with one of the traditional processes for thermoplastic resins), of a three-dimensional lattice by opening and polymerising the acrylic side groups.

However, although it is less advantageous (except for certain particular applications, such as the manufacture of prepregs), it is possible distinctly to separate the processing stage from the crosslinking stage.

Likewise, it is possible to carry out the above two stages simultaneously, for example if the processing is carried out by casting; in this case, the polycondensation reaction leading to the formation of the polyurethane is carried out simultaneously with the free-radical polymerisation reaction of the acrylic groups.

Of course, in practice, it is advantageous for the two stages to be carried out in succession, as a continuous process, in order to preserve the advantage of the processing of thermoplastics.

The materials thus obtained can have numerous applications in view of the flexibility of processing, as has just been described.

After injection moulding or extrusion and then crosslinking, the products prepared according to the invention lead to plates or profiles (which have applications in the field of transparent materials), sheaths, flexible or semi-rigid joints, cables and the like.

These products can also be used in association with inorganic or organic fillers in order to obtain composite materials. In this application, it is advantageous to use resins of low viscosity.

Thus, short fibres of the glass fibre or carbon fibre type can be introduced as fillers into the polyurethanes prepared according to the invention, and, after injection moulding and then crosslinking, the latter can lead to particularly strong mechanical components which can be used, for example, in the motor car industry.

Another particularly valuable application relates to the pultrusion of continuous fibres (glass, carbon, silica or kevlar) for preparing high-performance profiles which can be used as technical components in numerous fields, such as sport, aeronautics, machinery and the like. The absence of the risk of premature crosslinking in the pultrusion die represents an enormous advantage compared with the thermosetting resins (epoxy or polyester) which are normally used in this technique.

A particularly advantageous variant of this application relates to the manufacture of prepregs. Compared with the traditional systems for the manufacture of prepregs, which use epoxy or polyester resins, the resins according to the invention make it possible, on the one hand, to prepare prepregs which do not require low-temperature storage conditions because of their excellent stability at ambient temperature, and, on the other hand, to simplify the processing.

These techniques also make it possible to prepare, in accordance with processes permitting very high production rates (extrusion, injection moulding), materials containing heat-sensitive active products as a filler; it is thus possible to manufacture powders, propellants or explosives.

The examples below illustrate the invention.

The polyurethanes according to the invention were prepared by using 2,3-dihydroxypropyl acrylate, the characteristics of which are as follows, as the unsaturated diol:

| molecular weight: | 164 | |
| OH number: | 12.2 | eq/kg |
| degree of unsaturation: | 6.80 | eq/kg |

EXAMPLE 1

A polyurethane was prepared by the "one-shot" process in a solvent. The proportions of the various compounds used are indicated in the table below.

| STARTING MATERIALS | CHARACTERISTICS OF STARTING MATERIALS | MOLAR COMPOSITION | COMPOSITION BY WEIGHT g/100 g | FORMULATION PARAMETER |
| --- | --- | --- | --- | --- |
| Polyester-diol Hooker S 1063-210 | 3.8 OH/kg | 1 mol | 56 g | NCO/OH = 1 |
| Butane-1,4-diol (c) | 21.8 OH/kg M = 92 | 2 mols | 19 g | $\frac{\text{Short-chain diol}}{\text{Long-chain diol}} = 4$ |
| Unsaturated diol (d) | 12.2 OH/kg M = 164 degree of unsaturation = 7 eq/kg | 2 mols | 35 g | $\frac{\text{Diol (c)}}{\text{Diol (d)}} = 1$ |
| Hylene W | 7.6 NCO/kg | 5 mols | 140 g | |
| Solvent CHCl$_3$ | | | 750 g | |
| Catalyst DBDL | | 0.5 P/polyols | 0.6 g | |

The polyaddition is carried out under the following conditions:
2 liter glass reactor
weight of the reaction mixture: 2,000 g
temperature: 40° ± 1° C.
continuous stirring under nitrogen
duration: 24 hours The kinetics are followed by determination of the free isocyanate. The polymer is recovered in the following manner:
the solution is diluted (×2 by weight with chloroform)
precipitation takes place in ligroin (40°-60° C. cut)
drying takes place in vacuo at ambient temperature.

Characteristics of the polymer obtained

The product obtained possesses the following characteristics:
total solubility in 1,2-dichloroethane
molecular weight: 20,000 (GPC)
glass transition temperature: 25° C.
softening point: 80° C.

Crosslinking conditions—characteristics of the product obtained

This product could be crosslinked under a press, with the aid of a plunger mould, in the presence of a free-radical promoter, according to the following conditions:
temperature of the platens: 120° C.

benzoyl peroxide (free-radical promoter): 2% by weight
duration: 15 minutes

After release from the mould, the product possesses the following characteristics:
total insolubility in the customary solvents
infusible
hardness: B 32 to 35 points on the BARCOL scale tensile characteristics:
elongation at break: 8%
original modulus: 5,200 daN/cm$^2$
stress at break: 325 kg/cm$^2$.

EXAMPLE 2

A polyurethane having the same composition as in Example 1 is prepared in bulk in accordance with the "one-shot" process.

A rapid mixer with Z-shaped blades is used. The products are mixed at 50° C. for 30 minutes, under nitrogen, and then cast into a mould. Baking in a ventilated oven lasts 24 hours at 60° C. 600 to 700 g of polyurethane are obtained per operation.

Characteristics of the product obtained

A hard and soluble product is obtained.

Crosslinking conditions without a free-radical promoter

Characteristics of the product obtained

This product was moulded under a press under the following conditions:
melting point: 160° C.
crosslinking temperature: 200° C.
crosslinking time: 10 to 60 minutes A transparent product having a Shore D hardness of 80–85 is obtained, which is insoluble in all the customary solvents (1,2-dichloroethane, chloroform and tetrahydrofuran).

EXAMPLE 3

A polyurethane of which the composition does not contain any long-chain diol is prepared in bulk in accordance with the "one-shot" process. The procedure is identical to that adopted in Example 2.

| STARTING MATERIALS | CHARACTERISTICS | Composition MOLAR COMPOSITION | COMPOSITION BY WEIGHT | FORMULATION PARAMETERS |
|---|---|---|---|---|
| Butane-1,4-diol (c) | 21.08 OH/kg M = 92 | 1 mol | 12% | NCO/OH = 1 |
| Unsaturated diol (d) | 12.2 OH/kg M = 164 | 1 mol | 21% | $\frac{\text{diol (c)}}{\text{diol (d)}} = 1$ |
| Hylene W | 7.6 NCO/kg | 2 mols | 67% | |

Characteristics of the polymer obtained

A product which possesses the following characteristics is obtained:
soluble in tetrahydrofuran
molecular weight of 12,000
softening point: 80° C.

Malaxation of the product in a BRABENDER chamber

The product was introduced into a BRABENDER chamber for thermoplastics, at 90° C. The following results are obtained:

After a malaxation time of 5 minutes at 20 rpm, the plastic mass around the malaxating cams is transparent. The torque recorded is then 2,000 g×m.

An abrupt increase in the torque is observed after a malaxation time of 15 minutes; the product obtained is a very hard powder which is insoluble in all the customary solvents.

The addition of 1% of hydroquinone, at the start of malaxation, made it possible to preserve the thermoplastic behaviour of the product for at least 20 minutes.

EXAMPLE 4

A polyurethane of low viscosity was synthesised in the following manner:

| STARTING MATERIALS | CHARACTERISTICS OF STARTING MATERIALS | MOLAR COMPOSITION | COMPOSITION BY WEIGHT g/1,000 g | FORMULATION PARAMETER |
|---|---|---|---|---|
| Polyester-diol Hooker S 1063-210 | 3.81 OH/kg M = 525 | 1 mol | 56 g | NCO/OH = 0.9 |
| Butane-1,4-diol (c) | 21.08 OH/kg M = 92 | 2 mols | 19 g | $\frac{\text{short-chain diol}}{\text{long-chain diol}} = 4$ |
| Unsaturated diol (d) | 12.2 OH/kg M = 164 degree of unsaturation = 7 eq/kg | 2 mols | 35 g | $\frac{\text{diol (c)}}{\text{diol (d)}} = 1$ |
| Hylene W | 7.6 NCO/kg | 4.5 mols | 140 g | |

Manufacturing conditions

1. Incorporation of the unsaturated diol+polyester at T=60° C.
   Progressively increasing vacuum for 1 hour
2. Incorporation of butane-1,4-diol
   Mixing under dry nitrogen for ¼ hour
3. Introduction of hylene W at T=60° C.
   Mixing under dry nitrogen for 30 minutes
4. Casting, filtration
5. Baking at 50° C. in a box impervious to moisture, for 48 hours.

Characteristics of the polymer solubility in the customary solvents for polyurethanes
molecular weight: 8,000
glass transition temperature: 7° C.
degree of conjugated unsaturation: 0.76 eq/kg
softening point: 70° C.

Crosslinking conditions—Characteristics of the product obtained

The product was moulded under a press under the following conditions:
crosslinking temperature: 200° C.
crosslinking time: 60 minutes
Transparent products are obtained; the characteristics are as follows:
insoluble in the customary solvents
Shore D hardness of 85 to 90

EXAMPLE 5

Preparation of a polyurethane from an aromatic diisocyanate.

The manufacturing conditions are as follows:
1. Incorporation of the unsaturated diol+polyester at T=40° C.
   Progressively increasing vacuum for 1 hour
2. Incorporation of the butane-1,4-diol
   Mixing for 20 minutes whilst bubbling air
3. Introduction of the TDI at T=40° C.
   Mixing under a stream of air for 5 minutes
4. Casting to a thickness of 10 mm
5. Baking for 24 hours at 60° C.

Crosslinking in the presence of dicumyl peroxide

The product was moulded under a press at 200° C. for 5 minutes. An insoluble product is obtained.

EXAMPLE 6

The product prepared in accordance with Example 1 is extruded under the following conditions:

Equipment used

BRABENDER extrusiograph:
Screw φ: 19 mm
Length/diameter=25
Compression ratio: 3/1
Die:length=25 mm; thickness=0.6 mm The temperature measurements carried out over the whole length of the sheath are combined in the table below:

| | Inlet | ⅓ | ⅔ | Outlet |
|---|---|---|---|---|
| T shown in °C. | 90 | 85 | 85 | 90 |
| T of substance in °C. | | 98 | 96 | 93 |
| pressure of substance: | 400 to 500 bars | | | |
| back-pressure: | 350 bars | | | |
| torque: | 9,000 to 10,000 g × m | | | |
| speed: | 45 rpm | | | |

These experiments showed that the product was extrudable and remained transparent and thermoplastic after extrusion.

Results

A transparent strip was obtained. The extrudate obtained has the following properties:
solubility in chloroform
when subjected to heating at 150° C. for 1 hour, this transparent extrudate becomes insoluble in chloroform.

EXAMPLE 7

The product prepared in accordance with Example 2 is moulded under a press.

Mould used

| STARTING MATERIALS | CHARACTERISTICS OF STARTING MATERIALS | MOLAR COMPOSITION | COMPOSITION BY WEIGHT g/1,000 g | FORMULATION PARAMETER |
|---|---|---|---|---|
| Polyester-diol Hooker S 1063-55 | 1 OH/kg M = 2,000 | 1 mol | 600 g | NCO/OH = 0.95 |
| Butane-1,4-diol (c) | 21.8 OH/kg M = 92 | 2 mols | 55 g | $\frac{\text{short-chain diol}}{\text{long-chain diol}} = 4$ |
| Unsaturated diol (d) | 12.2 OH/kg M = 164 degree of unsaturation = 7 eq/kg | 2 mols | 98 g | $\frac{\text{diol (c)}}{\text{diol (d)}} = 1$ |
| Pure TDI | M = 174 11.2 NCO/kg | 4.75 mols | 247 g | |

Characteristics of the polymer solubility in solvents (presence of microgels in 1,2-dichloroethane)
softening point: 85° C.

Steel mould making it possible to produce plates having a thickness of 2 mm and a surface area of 35×60 mm².

Moulding conditions

The polyurethane was moulded under a press under the following conditions:

1. Drying of the product to a powder, under a progressively increasing vacuum, for 24 hours at 30° C.
2. Heating of the mould to the temperature $T_m$ (melting point of the substance).
3. Incorporation of the polyurethane; closing of the mould.
4. Maintaining of the temperature, without pressure, for the time $t_m$ (melting time of the substance).
5. Application of a low pressure (moulding pressure) with gradual increasing of the temperature up to $T_c$ (crosslinking temperature).
6. At $T_c$, application of the crosslinking pressure for the time $t_c$ (crosslinking time).
7. Maintaining of the pressure; rapid cooling.
8. Release from the mould.

The table below sets out the moulding conditions which permitted the production of plates of transparent and crosslinked polyurethane, without an additive.

TABLE 1

| Moulding reference | Moulding conditions | | | | |
|---|---|---|---|---|---|
| | 4 | 5 | 6 | 7 | 8 |
| $T_m$-temperature of the mould (°C.) | 160 | 160 | 160 | 160 | 160 |
| $t_m$-melting time (minutes) | 10 | 10 | 10 | 10 | 10 |
| Moulding pressure (bars) | 10 | 10 | 10 | 10 | 8 |
| $T_c$-crosslinking temperature | 200 | 200 | 200 | 200 | 200 |
| $t_c$-crosslinking time (minutes) | 10 | 60 | 60 | 60 | 10 |
| Measurements carried out on the plates | | | | | |
| hardness (Shore D) | 80 | 85 | 80 | 80 | 75 |
| swelling (%) | 800 | 400 | 325 | 350 | 900 |

Characteristics of the polyurethanes obtained

The following measurements were carried out on the transparent plates obtained by moulding:
- solubility (1,2-dichloroethane, chloroform)
- Shore D hardness
- swelling in methylene chloride:
  - duration: 70 hours
  - temperature: 20° C.

All the products are insoluble after moulding and the Shore D hardnesses obtained are of the order of 75 to 85 (see Table No. 1). The swelling measurements after 70 hours at 20° C. show that the crosslinking density increases with the increase in the baking time (a reduction in swelling is observed).

EXAMPLE 8

The product prepared in accordance with Example 2 is moulded under a press in the presence of a free-radical promoter (dicumyl peroxide).

Mould used

Steel mould permitting the production of plates having a thickness of 2 mm and a surface area of 100×80 mm².

Moulding conditions

1. The polyurethane and the dicumyl peroxide are dried and degassed under a progressively increasing vacuum for 48 hours at 30° C.
2. Heating of the mould to the temperature $T_m$ (melting point of the substance).
3. Depositing, into the mould, of the intimate mixture of the constituents (polyurethane+peroxide)—closing of the mould.
4. Maintaining of the temperature for the time $t_m$.
5. Application of a low pressure (moulding pressure) with progressive increasing of the temperature up to $T_c$ (crosslinking temperature).
6. At $T_c$, application of the crosslinking pressure for the time $t_c$ (crosslinking time).
7. Maintaining of the pressure, rapid cooling.
8. Release from the mould.

The table below summarises the moulding conditions which permitted the production of polyurethane plates.

| Percentage by weight of dicumyl peroxide | 0.14% | 0.14% | 0.4% | 0.4% |
|---|---|---|---|---|
| Moulding $T_m$(temperature of the mould), °C. | 130 | 130 | 130 | 130 |
| $t_m$(softening time), minutes | 5 | 5 | 5 | 5 |
| Moulding pressure (bars) | 20 | 15 | 20 | 20 |
| $T_c$(crosslinking temperature), °C. | 200 | 200 | 200 | 200 |
| $t_c$(crosslinking time), minutes | 10 | 40 | 5 | 60 |
| Measurements carried out on the plates | | | | |
| Hardness (points on the BARCOL scale) | 20 to 30 | 20 to 30 | 20 to 30 | 25 to 30 |
| Swelling (%) ($CH_2Cl_2$-20° C.-70 hours) | 98 | 108 | 110 | 130 |
| Flexion E (hbars) | 200 | 200 | 200 | 200 |
| Stress at break (bars) | 800 | 800 | 800 | 800 |
| Deflection at break (mm) | 7 | 7 | 7 | 7 |

EXAMPLE 9

The product prepared in accordance with Example 2 was injection-moulded.

Injection-moulding equipment press of type 150/60
maximum closing force: 60 tonnes
maximum volume injected: 90 cm³
plasticising by a screw of $\phi$30 mm

Product of the experiment

The mould used makes it possible to produce 150×150 mm plates having a thickness of 2 mm.

Conditions:

The substance is heated in an oven at 60° C. for 4 hours under a progressively increasing vacuum.
temperature: 90° to 120° C.
injection pressure (oil pressure): 95 bars
temperature of the mould: 180° C.
mould residence time: 20 minutes

Results:

This experiment enabled us to obtain transparent plates having a Shore D hardness of 80, which are insoluble in the customary solvents.

EXAMPLE 10

A polyurethane having the same composition as that of Example 2 is prepared in bulk in accordance with the "one-shot" process, by introducing the di-tert.-butyl peroxide at the same time as the other constituents. A product which is hard and soluble in the customary solvents is obtained.

The product is then extruded under the following conditions:
screw $\phi$:19 mm
length/diameter=25
compression ratio:3/1
die: length=100 mm; thickness=0.8 mm The temperature measurements carried out over the whole length of the sheath are combined in the table below.

|  | Inlet | ⅓ | ⅔ | Outlet |
|---|---|---|---|---|
| T shown in °C. | 130 | 120 | 130 | 150 |
| back-pressure: |  |  | 50 bars |  |
| torque: |  |  | 3,500 g × m |  |
| speed: |  |  | 75 rpm |  |
| extrusion time: |  |  | 1 hour |  |

EXAMPLE 11

A polyurethane was prepared by replacing the polyester-diol of molecular weight 525 by a polyester-diol of molecular weight 950.

|  | Molar composition | Formulation parameters |
|---|---|---|
| Polyester-diol S 1063–120 | 1 mol | NCO/OH = 1 |
| Butanediol (c) | 2 mols | $\frac{\text{short-chain diol}}{\text{long-chain diol}} = 4$ |
| Unsaturated short-chain diol (d) | 2 mols | $\frac{\text{diol (c)}}{\text{diol (d)}} = 1$ |
| Hylene W | 5 mols |  |
| Dicumyl peroxide catalyst, relative to the unsaturated diol (d) | 3% |  |

The glass transition temperature of the thermoplastic polyurethane is 3.2° C. Crosslinking at 200° C. as previously.

Properties of the crosslinked product:

| swelling (%), $CH_2Cl_2$: | 78 |
|---|---|
| hardness (points on the Barcol scale): | 15 |
| flexural modulus E: | 110 |
| flexural stress at break: | 430 |
| deflection at break: | 4.6 |

We claim:

1. Crosslinkable thermoplastic polyurethane resin containing ethylenic side groups, which is the product of the reaction of:
   (a) an organic diisocyanate,
   (b) a long-chain saturated linear diol having a molecular weight of between 450 and 4,000,
   (c) an aliphatic, cycloaliphatic or aromatic compound having a molecular weight of less than 300, which contains 2 to 20 carbon atoms and possesses two groups having at least one hydrogen atom which is active towards the NCO groups, and
   (d) an unsaturated diol consisting of the acrylic or methacrylic acid ester of a trihydric alcohol, of the formula:

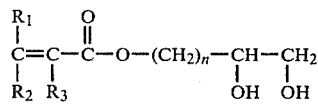

in which $R_1$ and $R_2$, which are identical or different, are hydrogen, a lower alkyl group, an aryl group or a halogen, $R_3$ is hydrogen, a lower alkyl, aryl or cycloalkyl group or a halogen and n is 1, 2, 3 or 4 the diisocyanate compound (a) being present in a ratio NCO: group having at least one H which is active towards the NCO groups, which is less than or equal to 1.1, the molar ratio diol (b): compounds (c)+(d) being between 0 and 10 and the molar ratio compound (c): unsaturated diol (d) being between 0 and 10 if b≠0 and between 1 and 10 if b=0.

2. Polyurethane resin according to claim 1, wherein the compound (c) is a member selected from the group consisting of saturated or unsaturated diols and a mixture of these compounds.

3. Polyurethane resin according to claim 1, wherein the unsaturated diol (d) has the formula:

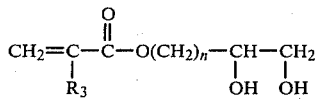

$R_3$ and n having the same meaning.

4. Polyurethane resin according to claim 3, wherein the unsaturated diol (d) is 2,3-dihydroxypropyl acrylate or methacrylate.

5. Polyurethane resin according to claim 1, having a molecular weight of between 15,000 and 100,000, wherein the ratio NCO:OH is between 0.95 and 1.1.

6. Polyurethane resin according to claim 1, having a molecular weight of less than 15,000, wherein the ratio NCO:OH is less than 0.95.

7. Polyurethane resin according to claim 1, which is mixed with a reactive diluent system comprising at least one unsaturated monomeric compound which can be polymerised by addition onto the said resin.

8. Preimpregnated materials which comprise a fibrous substance impregnated with a mixture containing at least one polyurethane resin according to claim 1.

9. Materials obtained by crosslinking the resins according to claim 1.

10. The thermoplastic polyurethane resin according to claim 1, wherein said long chain saturated linear diol (b) has a molecular weight between 500 and 2,500.

* * * * *